United States Patent
Day et al.

(10) Patent No.: US 9,473,571 B2
(45) Date of Patent: Oct. 18, 2016

(54) CONTROLLING THE OPERATION OF SERVER COMPUTERS

(75) Inventors: David Day, Ely (GB); Ian McDowell, Cambridge (GB)

(73) Assignee: Brocade Communications Systems, Inc., San Jose, CA (US)

( * ) Notice: Subject to any disclaimer, the term of this patent is extended or adjusted under 35 U.S.C. 154(b) by 435 days.

(21) Appl. No.: 13/530,740

(22) Filed: Jun. 22, 2012

(65) Prior Publication Data

US 2013/0047013 A1    Feb. 21, 2013

(30) Foreign Application Priority Data

Jun. 25, 2011 (GB) .................................. 1110862.8

(51) Int. Cl.
| | |
|---|---|
| *G06F 1/26* | (2006.01) |
| *G06F 1/32* | (2006.01) |
| *H04L 29/08* | (2006.01) |
| *G06F 9/50* | (2006.01) |
| *G06F 1/20* | (2006.01) |
| *H04W 36/22* | (2009.01) |
| *H04L 12/803* | (2013.01) |
| *H04W 28/08* | (2009.01) |
| *G06F 9/455* | (2006.01) |

(52) U.S. Cl.
CPC .......... *H04L 67/1008* (2013.01); *G06F 1/206* (2013.01); *G06F 1/3203* (2013.01); *G06F 9/5094* (2013.01); *H04L 67/1029* (2013.01); *H04L 67/32* (2013.01); *G06F 2009/4557* (2013.01); *H04L 47/125* (2013.01); *H04W 28/08* (2013.01); *H04W 36/22* (2013.01); *Y02B 60/142* (2013.01)

(58) Field of Classification Search
CPC ................. H04L 47/125; H04L 67/32; G06F 2009/4557; H04W 36/22; H04W 28/08
USPC .......................................... 713/320; 718/105
See application file for complete search history.

(56) References Cited

U.S. PATENT DOCUMENTS

| | | | |
|---|---|---|---|
| 7,086,061 | B1 | 8/2006 | Joshi et al. |
| 7,254,626 | B1 | 8/2007 | Kommula et al. |
| 7,423,977 | B1 | 9/2008 | Joshi |
| 7,496,651 | B1 | 2/2009 | Joshi |
| 7,574,508 | B1 | 8/2009 | Kommula |
| 7,584,301 | B1 | 9/2009 | Joshi |
| 7,647,427 | B1 | 1/2010 | Devarapalli |
| 7,657,629 | B1 | 2/2010 | Kommula |
| 7,676,576 | B1 | 3/2010 | Kommula |
| 7,716,370 | B1 | 5/2010 | Devarapalli |
| 7,756,965 | B2 | 7/2010 | Joshi |

(Continued)

FOREIGN PATENT DOCUMENTS

GB    2492172 A    12/2012

*Primary Examiner* — Xuxing Chen
(74) *Attorney, Agent, or Firm* — Polsinelli PC

(57) ABSTRACT

A plurality of server computers in a network that includes load balancing processes to enhance performance employs a non-performance related variable, such as power consumption, and modifies the load balancing processes in response to the reading of the non-performance variable. Such variables do not affect the response and performance as perceived by a browsing client but do provide other advantages with in the environment as a whole. The non-performance related variable is employed such that one or more of said server computers are de-activated to reduce power consumption, and the load balancing processes balance load across the remaining active server computers.

12 Claims, 14 Drawing Sheets

(56) References Cited

U.S. PATENT DOCUMENTS

| | | |
|---|---|---|
| 7,840,678 B2 | 11/2010 | Joshi |
| 7,885,188 B2 | 2/2011 | Joshi |
| 7,899,899 B2 | 3/2011 | Joshi |
| 7,949,757 B2 | 5/2011 | Joshi |
| 8,024,441 B2 | 9/2011 | Kommula et al. |
| 8,280,998 B2 | 10/2012 | Joshi |
| 8,510,428 B2 | 8/2013 | Joshi |
| 8,755,267 B2 | 6/2014 | Devarapalli |
| 8,755,279 B2 | 6/2014 | Joshi |
| 8,862,740 B2 | 10/2014 | Joshi |
| 8,949,850 B2 | 2/2015 | Joshi et al. |
| 9,015,323 B2 | 4/2015 | Kommula |
| 9,130,954 B2 | 9/2015 | Joshi et al. |
| 2010/0011120 A1 | 1/2010 | Kommula |
| 2010/0095008 A1 | 4/2010 | Joshi |
| 2010/0106990 A1* | 4/2010 | Kalman ............... 713/323 |
| 2010/0138679 A1* | 6/2010 | Yoshida ............... 713/321 |
| 2011/0035078 A1* | 2/2011 | Jackson ........... G06F 1/3203 |
| | | 718/104 |
| 2011/0055605 A1* | 3/2011 | Jackson ............... 713/320 |
| 2011/0231860 A1* | 9/2011 | Kazama et al. ........ 718/105 |
| 2011/0320834 A1* | 12/2011 | Ingels et al. .......... 713/310 |
| 2012/0030356 A1* | 2/2012 | Fletcher ........... G06F 9/5094 |
| | | 709/226 |
| 2013/0173775 A1 | 7/2013 | Li |
| 2014/0219076 A1 | 8/2014 | Devarapalli |
| 2015/0381718 A1 | 12/2015 | Day et al. |

* cited by examiner

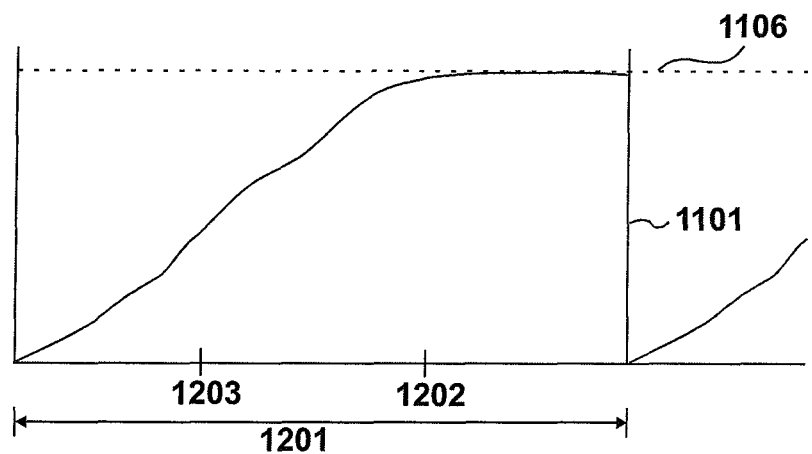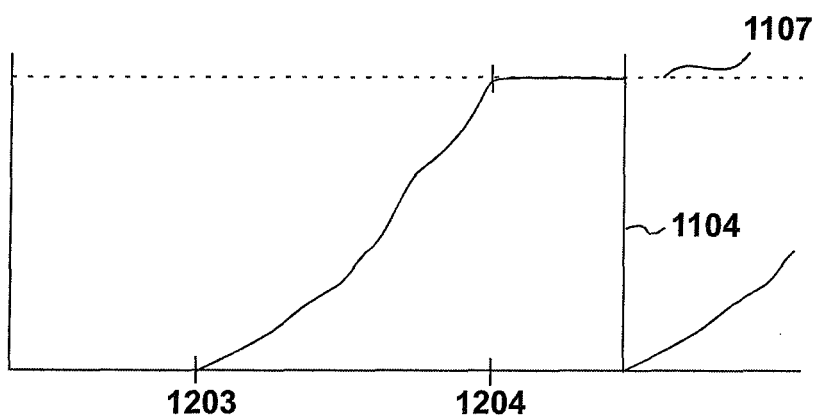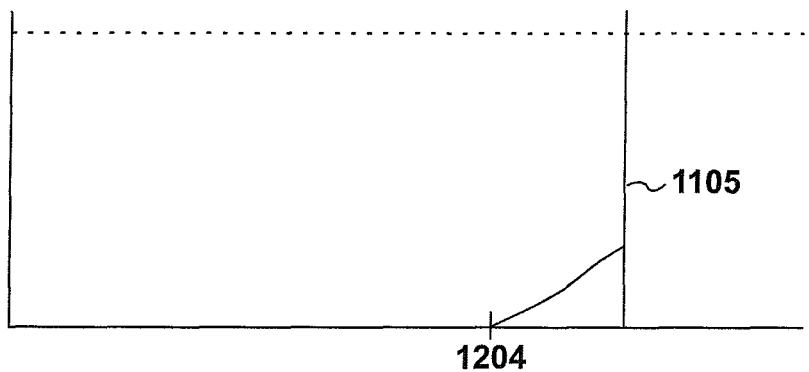
Fig. 12

CONTROLLING THE OPERATION OF SERVER COMPUTERS

CROSS REFERENCE TO RELATED APPLICATIONS

The present application claims the benefit of United Kingdom Patent Application No. 1110862.8, entitled Ecological Server Balancing, filed on Jun. 25, 2011, which is incorporated herein by reference.

BACKGROUND OF THE INVENTION

1. Field of the Invention

The present invention relates to controlling the operation of a plurality of server computers in a network that includes load balancing processes to enhance performance.

2. Description of the Related Art

It is possible for a plurality of server computers to be connected in a network each providing substantially similar services. Thus, a system of this type may be used to serve websites to a plurality of browsing clients over the internet. At times, the demands for a particular website may be extremely large and it is possible that this demand may be some what uneven, thereby placing higher constraints on servers in particular areas compared to other areas. Load balancing is performed as a mechanism for optimising the use of the available equipment and to minimise the risk of a website crashing or going down.

In addition to the conventional attributes of load balancing, it has been appreciated that other problems exist in relation to the overall optimisation of the system.

BRIEF SUMMARY OF THE INVENTION

According to an aspect of the present invention, there is provided a method of controlling the operation of the plurality of server computers of the aforesaid type, comprising the steps of reading a non-performance related variable: and modifying said load balancing processes in response to the reading of said non-performance variable.

BRIEF DESCRIPTION OF THE DRAWINGS

FIG. 12 shows bandwidth use with traffic redirected to an alternative facility;

DETAILED DESCRIPTION OF EXAMPLE EMBODIMENTS

FIG. 1

Figure 1:
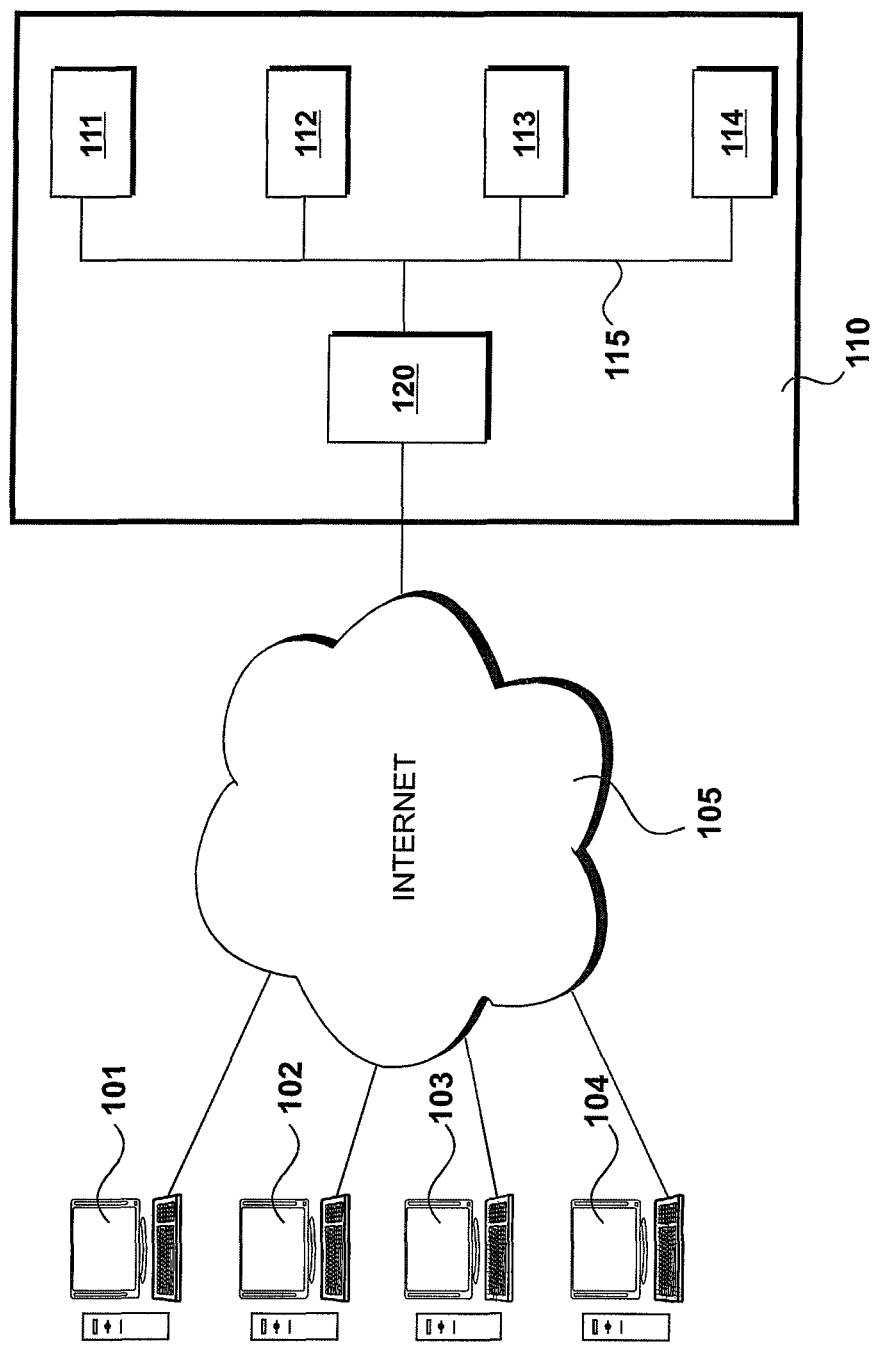
FIG. 1 shows an environment in which the invention may be implemented.

An environment in which the invention may be implemented is shown in FIG. 1. A number of clients 101, 102, 103 and 104 are connected to Internet 105. Each of clients 101 to 104 is a device capable of connecting across a network to a service provider 110. For example, they may be desktop computers, laptops, mobile computing devices, or any other suitable computing device. In this example they connect across Internet 105, but they could be connecting to a local area network, a wide area network or some other type of network.

Service provider 110 comprises a number of servers 111, 112, 113 and 114. These all have access to the same data and respond to client requests in the same way, such that a request for data from any one of clients 101 to 104 can be routed to any one of servers 111 to 114 and be treated in exactly the same way. Servers 111 to 114 may be physically separate or may reside on one or more physical machines, and are connected by a local network 115.

In other embodiments the servers may be connected over any type of network, and would in fact be remote from each other. However, for performance reasons, it is preferable for the traffic manager and managed servers to be on a local network.

The routing of client requests to the servers is performed by a traffic manager 120. This receives requests over the Internet 105 from a client computer and uses load balancing algorithms to determine which server to send the request to.

Once the load balancing algorithm has selected a server, traffic manager 120 will connect to the selected server, say server 111, and route the request.

FIG. 2

A traffic manager 120 is shown in FIG. 1, that may comprise a processor provided in this example by CPU 201, such as an Intel® Xeon® processor, eight gigabyte of RAM 202, and storage provided by a one terabyte hard disk drive 203. A portion of the storage on hard disk drive 203 is designated as virtual memory 204.

Instructions may be loaded from a CD-ROM 205 by a CD-ROM drive 206, or alternatively they may be downloaded from a network via a network interface 207.

Network interface 207 also provides connectivity to the Internet 105 and to local network 115, in order that traffic manager 120 may route requests between clients and the servers.

User input operations are facilitated by an input device interface 208, which allows the connection of human interface devices such as display 209, keyboard 210 and mouse 211.

FIG. 3

Figure 3:
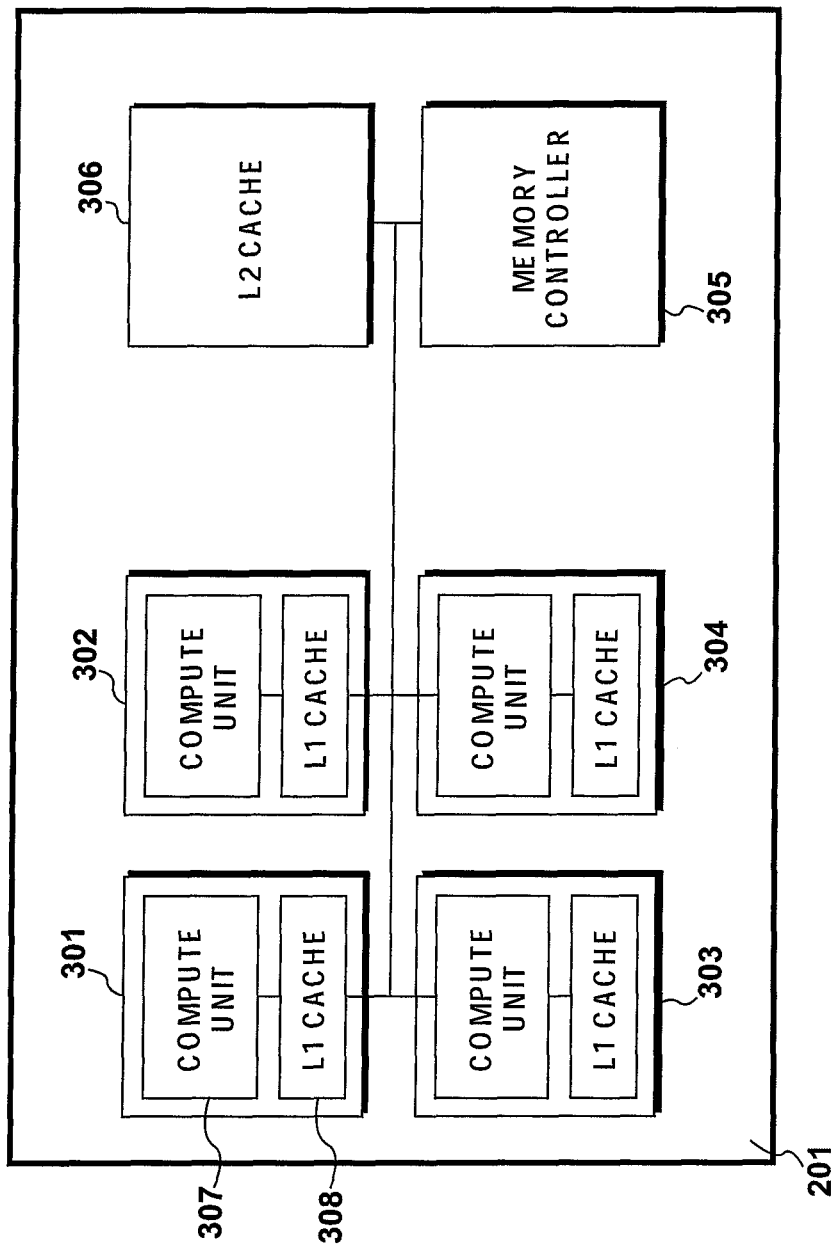
FIG. 3 illustrates details of CPU 201.

Central processing unit (CPU) 201 is detailed in FIG. 3. The CPU 201 may contain four cores 301, 302, 303 and 304, along with a memory controller 305 and a level two cache 306.

Core 301 includes a compute unit 307 and a level one cache 308. The other cores are identical. Providing four cores in a single CPU allows up to four sets of instructions to be processed simultaneously by CPU 201, thus increasing the speed and efficiency of traffic manager 120. In other embodiments, the CPU could have a different number of cores, or the processor could be provided by more than one CPU. Also, more than one compute unit could be presented to an operating system on each core through the use of simultaneous multi-threading or similar.

The level one caches of the cores and the level two cache 306 combine with RAM 202 and virtual memory 204 to provide memory for traffic manager 120. The exact location of instructions and data within the memory will vary between embodiments, implementations and particular requirements at any specific time.

FIG. 4

Figure 2:
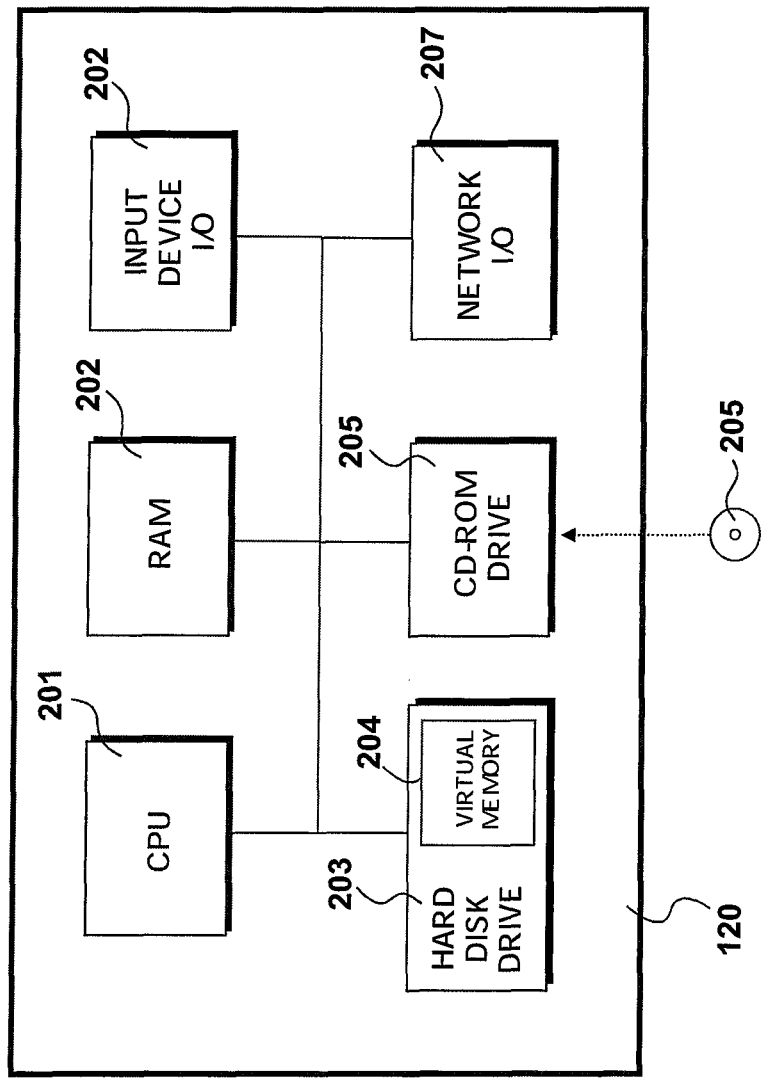
FIG. 2 shows details of traffic manager 120.
Figure 4:
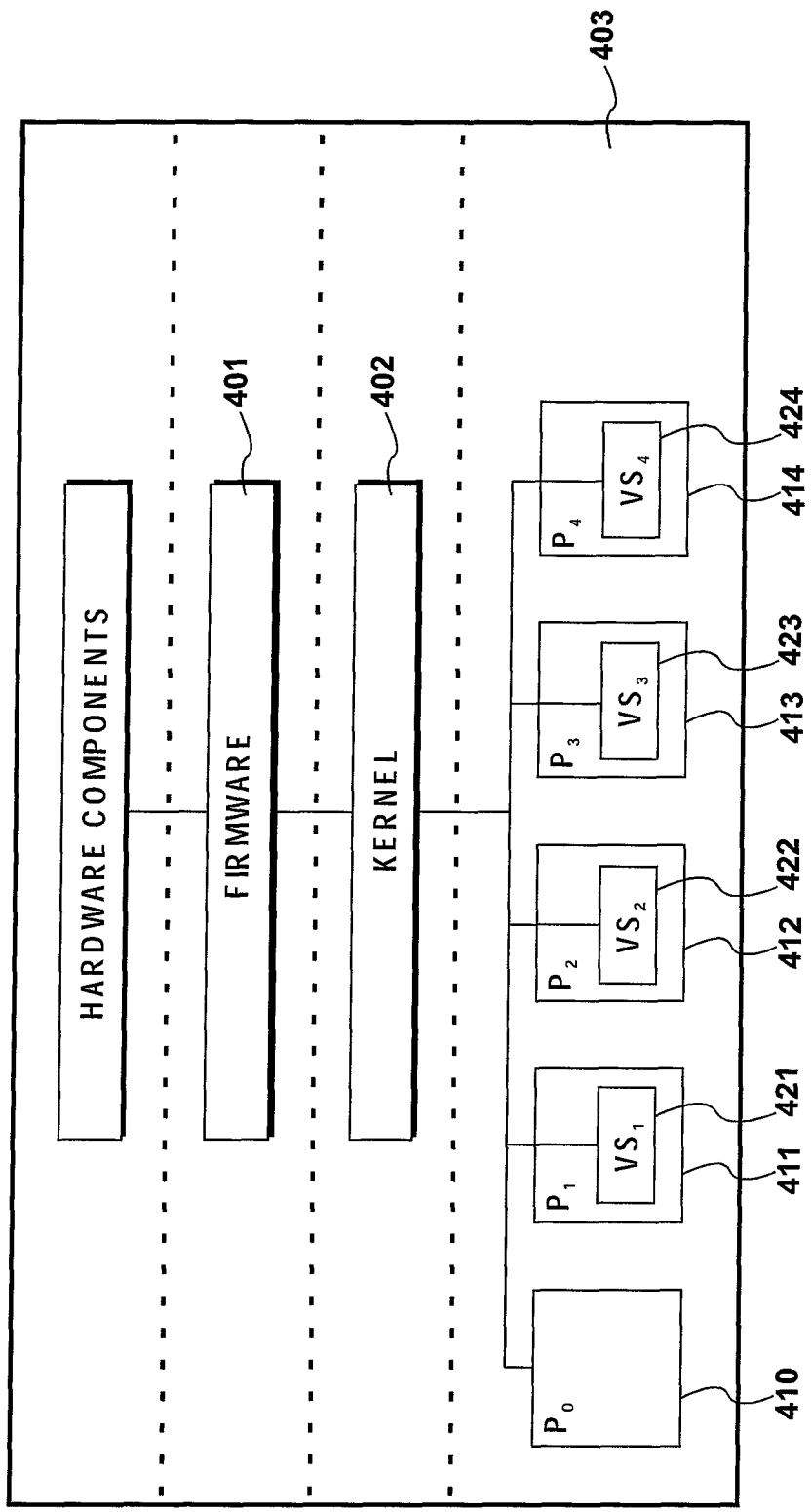
FIG. 4 shows an abstraction layer diagram of traffic manager 120.

An abstraction layer diagram of traffic manager 120 is shown in FIG. 4. On the first level are the hardware components detailed in FIGS. 2 and 3.

At the next level is firmware 401 that receives instructions from a kernel 402 and converts them into machine code executable by the components.

Kernel 402 manages allocation of memory to processes and the scheduling of process threads to CPU 201. Kernel 402 allocates portions of memory to various processes under its control. A portion is allocated as shared memory, which is readable and writable by all processes. Some portions are readable and writable only by the kernel 402 itself, and others are only readable and writable by individual processes. Additionally, kernel 402 manages the flow of output data provided by the firmware 401 to processes.

Process layer 403 comprises in this example five processes. Process 410 is a parent process that spawns child processes 411, 412, 413 and 414. In this example, four processes 411 to 414 are spawned because there are four compute units available. At any one time, each of the compute units may be running threads associated with one only of the processes 410 to 414.

Each of processes 411 to 414 includes a virtual server 421 to 424 for performing processing on requests.

Kernel 402 dispatches connection requests received by network interface 207 to processes 411 to 414. The choice of process to which a connect request is directed is based on the configuration of the network interface 207 and processes 411 to 414.

Virtual server 421 in process 411 receives requests from kennel 402, and performs request modification according to predefined rules. Upon completion of request modification, virtual server 421 runs a load balancing algorithm to select which of servers 111 to 114 to dispatch each request to. Requests are then routed by opening a connection to the selected server. The remaining processes 412 to 414 operate in a similar way.

The virtual servers 421 to 424 monitor the connections they make to the servers and produce monitored connection data.

The architecture of many current traffic management systems, particularly hardware-based solutions, relies on the use of physically separate electronics for performing processing and routing of requests.

FIG. 5

Figure 5:
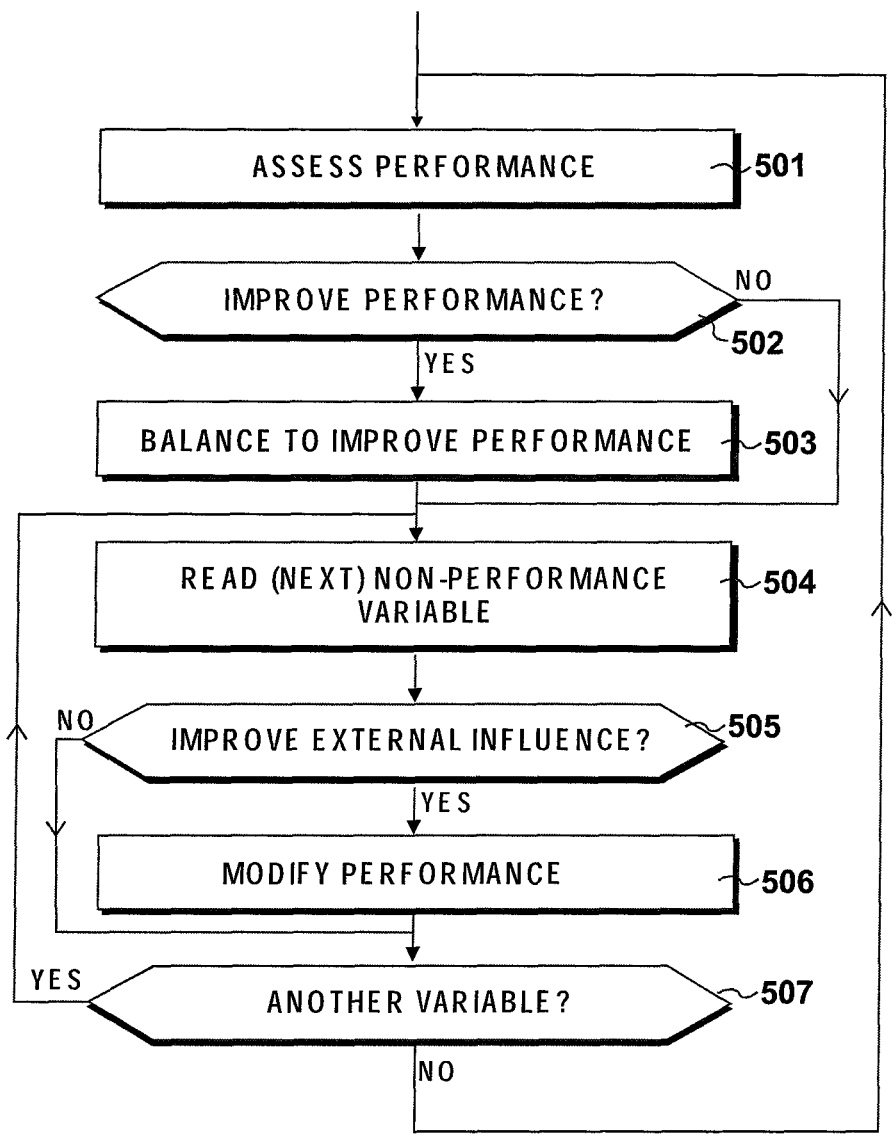
FIG. 5 outlines a method of controlling the operation of server computers.
Figure 6:
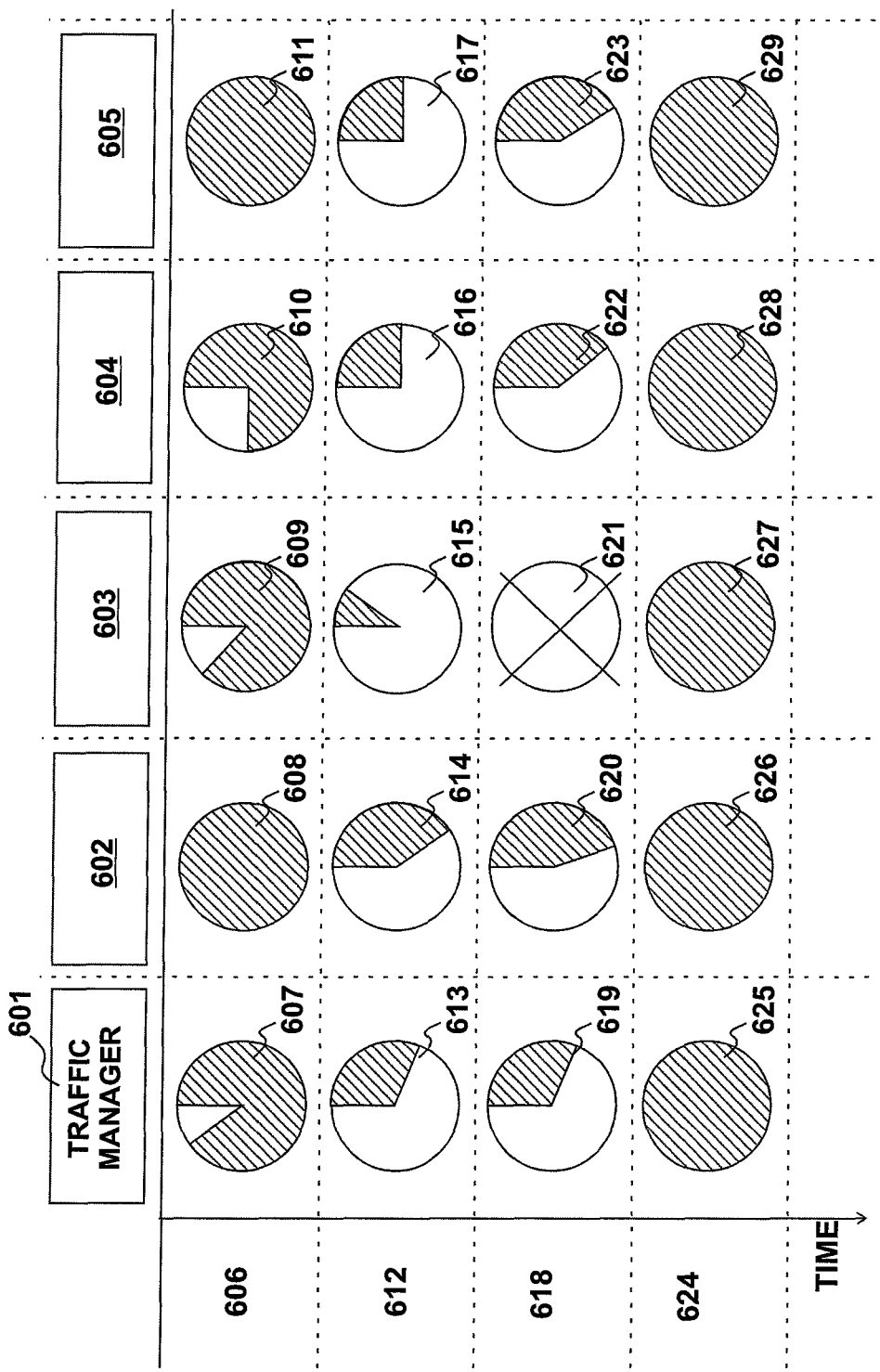
FIG. 6 shows an embodiment in which power consumption is minimised.

A method of controlling the operations of a plurality of server computers in a network that includes load balancing processes is illustrated in FIG. 5. The method includes load balancing processes to enhance performance. In addition, the method is sensitive to other non-performance related variables which do not affect the response and performance as perceived by a browsing client but do provide other advantages with in the environment as a whole.

At step 501, performance is assessed from a load balancing perspective and at step 502 a question is asked as to whether it is possible to improve the load balancing performance. If this question is answered in the affirmative, the load balancing is performed in order to improve overall performance and minimise the risk of a connection being lost.

At step 504 a non-performance variable is read. This may relate to power consumption at a particular site, running temperatures or the cost of using server computers at a particular site at a particular period of the day etc.

At step 505 a question is asked as to whether it is possible to improve the external influence. Thus, if a server computer is running at a relatively high temperature, the question asked step 505 may be to the effect as to whether it is possible to reduce this temperature by directing requests elsewhere. If this question is answered in the affirmative, further load balancing activities are performed in order to modify the performance in response to the external parameter at 506. Alternatively, if the question at 505 in answered in the negative, step 506 is bypassed. Thereafter, at step 507 a question is asked as to whether another variable is to be considered and if answered in the affirmative the next non-performance variable is read at step 504. If the question asked at 507 is answered in the negative, control is then returned to step 501 to perform, if required, further conventional load balancing activities. Thus, the non-performance related variables are read and the load balancing processes are modified in response to the reading of these non-performance variables.

The method performed as described in FIG. 5 is carried out independently of the load balancing calculations. The method of FIG. 5 may be carried out at specified intervals and it frequency may depend upon the traffic being balanced or other external constrains.

FIG. 6

In an embodiment, the non-performance variable is power consumption. A traffic manager 601 directs the request for data to one of four server computer systems, identified as 602, 603, 604 and 605. At time 606 the amount of traffic being balanced by the traffic manager 601 is illustrated by pie chart 607. Thus, the shaded region of pie chart 607 represents the proportion of the traffic managers capability that is being deployed. The traffic manager directs requests to sever 602, 603, 604 or 605. Again, at time 606, the activity at server 602 is illustrated by pie chart 608, the activity at 603 is represented by pie chart 609, the activity of 604 is represented by pie chart 610 and the activity of sever 605 is represented by pie chart 611. As shown in this example, at time 606, server computers 602 and 605 are operating at 100 percent with a degree of an additional bandwidth being available at server 603 and server 604.

At time 612, the overall requirements have reduced as illustrated by pie chart 613. During time period 612, traffic manager 601 continues to balance requests over all four sever computers 602 to 605. Thus, as illustrated by pie chart 614, 615 and 616 and 617 respectively, servers 602 to 605 are operational that their degree of usage has been reduced significantly.

In this embodiment, in order to reduce overall power consumption, thereby responding to the non-performance variable, one or more of the server computers 602 to 605 is deactivated to reduce power consumption. The load balancing processes balance load across the remaining active server computers.

In this example, at time 618 the total load through the traffic manger, as illustrated by pie chart 619 is substantially similar to the total load at time 612 (as illustrated by pie chart 613). However, server computer 603 has been deactivated. As a consequence of this, a greater demand is made of server 602 as illustrated by pie chart 620. As illustrated by pie chart 621, server 603 is no longer available for time period 618. Traffic continues to be directed towards server 604, as represented by pie chart 622 and also continues to be directed toward server 605, as illustrated by pie charts 623.

For the purpose of this illustration, at time 624, overall traffic has increased, with the traffic manager 601 reaching capacity. Thus, in order to maintain connection, full capacity is derived from server 602 to 605 as illustrated in pie chart 626 to 629 respectively.

In an embodiment, the server computers 602 to 605 are located in the same facility as power consumption at that facility is reduced by deactivating server system that are not required in order to satisfy the overall demands. However, in an alternative embodiment, a plurality of server computers are split in to a plurality of groups of server computers. Each said group of server computers is located at a respective facility. In this arrangement, the facilities may be separated geographically and may, globally, exist in difference time zones.

Thus, a server facility could be provided in the United States, a second in Europe and a third in Japan. One or more server computers at a specific facility are deactivated in order to deactivate the whole of the facility.

FIG. 7

Figure 7:
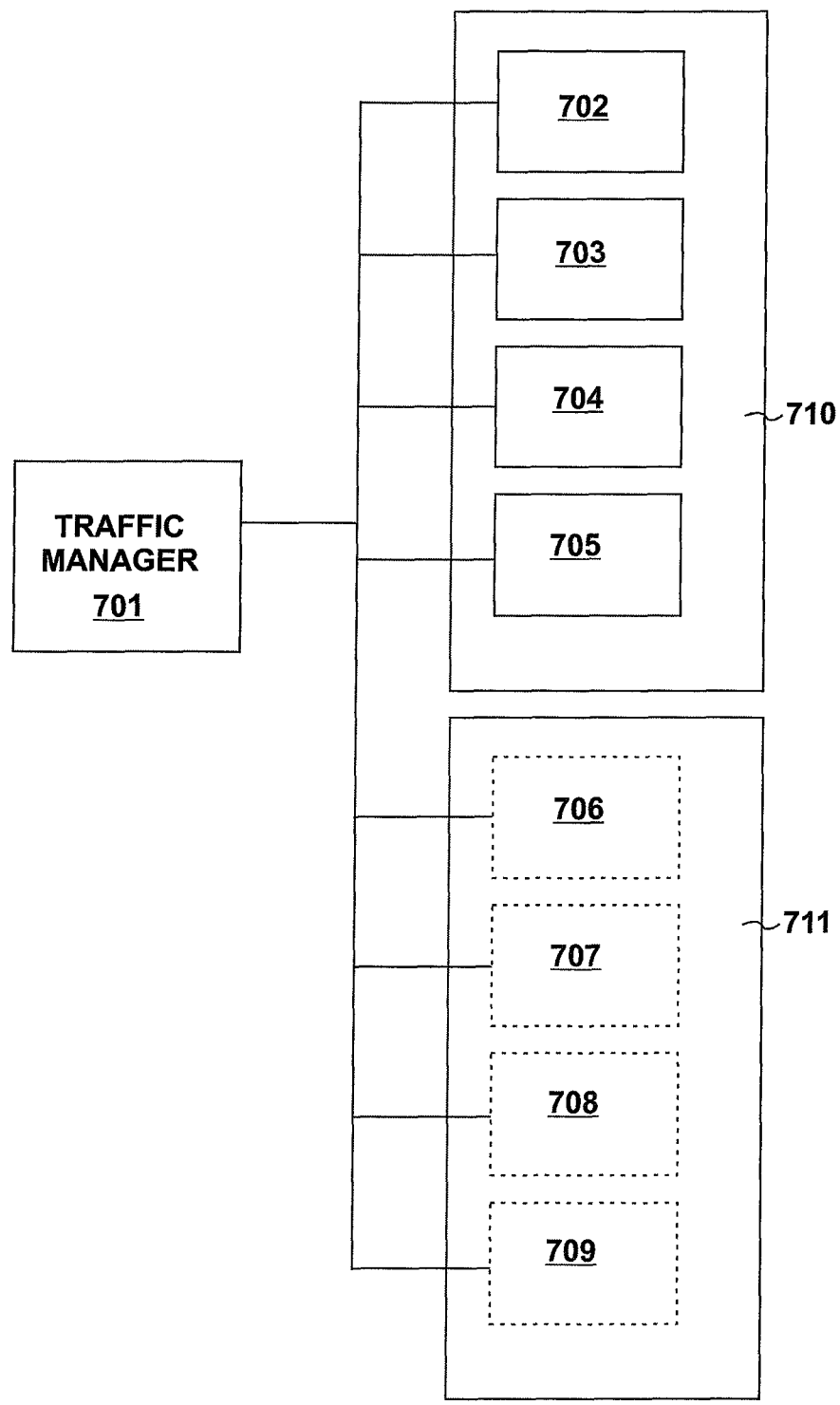
FIG. 7 illustrates the deactivation of a facility.

In the embodiment shown is FIG. 7, a traffic manager 701 distributes traffic to a first server system 702, a second server system 703, a third server system 704, a fourth system 705, a fifth system 706, a sixth system 707, a seventh system 708 and an eighth system 709. Server systems 702 to 705 are located at a first facility 710 and server 706 to 709 as located at a second facility 711. It may be assumed that, for whatever reason, server facility 711 requires more electrical energy to operate compared to facility 710 and is consequentially more expensive to run.

In an alternative embodiment, from a user's perspective, contractual situations may exist such that the user experiences a higher charge when using facility 711 compared to 710. In either event, it is preferable for facility 710 to be used over facility 711. Thus, when full bandwidth is required and traffic manager 701 distributes traffic throughout the servers, all servers, 702 to 709 are deployed. However, as bandwidth requirement reduces, server system 706 to 709 are deactivated until, eventually, no use is made of facility 711.

FIG. 8

In an embodiment, the non-performance variable is operating temperature. Consequently, it is possible to integrate load balancing with the power and thermal profiles of the facility or data centre. Thus, in addition to load balancing to enhance the performance of the system, resources are also managed efficiently, not affecting the performance of the system as such but by modifying the load balancing activities in respond to these non-performance variables, is it possible to manage the resources efficiently and reduce costs.

It is known for server systems to be provided with devices for measuring operational temperature, including the temperature of central processing units. In some systems, it is possible for the clock speed of the central processing unit to be reduced, thereby reducing power consumption. It is therefore possible for the load balancing activates to take into account the temperature and power consumption of the server systems and to reduce traffic that is directed to server systems that are approaching temperatures or power thresholds; thus, if a server is getting close to a temperature threshold, it is possible for the traffic to be moved away thereby reducing the operational temperature.

As previously described, at the opposite end of the spectrum, if a server is running on very low capacity, it may be preferable to divert traffic to a different server so that the low capacity server may be turned off all together.

It is understood that a further requirement exists in terms of identifying the physical position of what may be seen by operational programs as virtual servers. Known load balancing techniques do not take account of where the servers actually are but if non-performance variables such as temperature are being considered, the actual location becomes important.

Thus, in an embodiment, it is possible to identify the physical location of physical servers. Thus, if the servers are located close together, possibly on the same rack or in close proximity within a data centre, although seen as separate, they may contribute to the same power consumption. In addition, if the server systems are close together, they will affect each other's temperatures.

Figure 8:
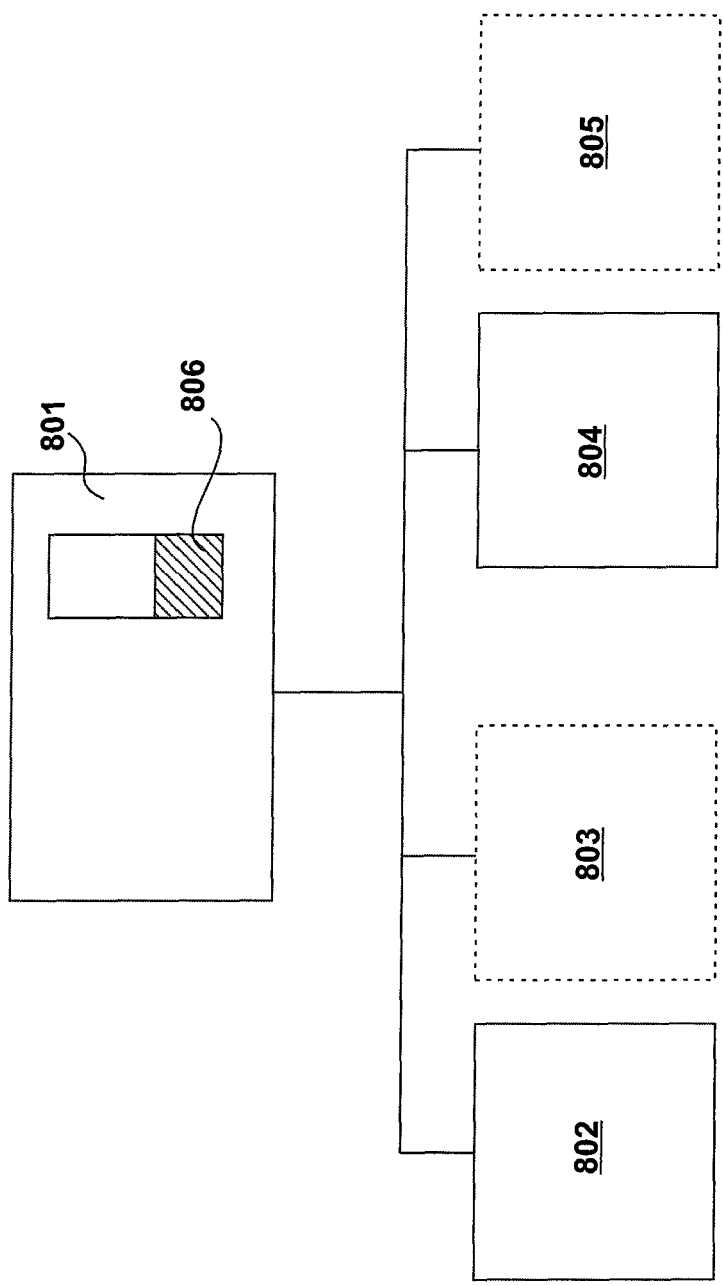
FIG. 8 shows the deactivation of a server computer in close proximity to a further server computer.

In FIG. 8, a traffic manager 801 balances traffic over a first server system 802, a second server system 803, a third server system 804 and a fourth server system 805. Investigations, possibly by deploying software agents, have determined that server system 802 is in close proximity to server system 803. Similarly, server system 804 is in close proximity to server system 805.

As a requirement for service decreases, server system 802 remains active but server system 803 would be deactivated. As illustrated by representation 806, for the purposed for this example, it can be seen that the overall demand for service has reduced below 50 percent. Thus, having deactivated server 803 it will be possible to deactivate a possible further server system.

In the present arrangement, server system 802 is in close proximity to server system 803. Server system 803 has been deactivated therefore the temperature of server system 802 is not being influenced by heat being generated from server system 803.

If server systems 804 and 805 are active they are in close proximity therefore heat generated by one will influence the temperature of the other. Consequently, in order to displace heat sources and thereby optimise overall running temperature, it is preferable to deactivate server system 804 or server system 805 in preference to server system 802 when server system 803 has already been deactivated. Thus, for the purposes of this example, as shown in FIG. 8, server system 805 has been deactivated in addition to server system 803.

Thus, in this way, it is possible to bring up additional servers as load increases and turn off servers as loads drop while also optimising overall temperature generation.

As is known in the art, cooling can be passive or active and passive cooling is affected by many factors, such as the proximity of other equipment and the time of day etc. In known systems, active cooling will only be activated when necessary, such as when a pre-determined temperature threshold is exceeded. Thus, using the technique illustrated in FIG. 8, the use of active cooling maybe reduced thereby maximising the use of less expensive passive cooling.

FIG. 9

In an alternative embodiment, the non-performance related variable is the time of day. Deployment of this technique is possible when server facilities are distributed around the world. Thus, for example, a first facility 901 is resident in a first county, possible somewhere in the Americas. The second facility 902 is providing in a second part of the world, possibly Europe and a third facility 903 is located in the third region of the world, possibly East Asia.

A load balancing traffic management 904 is provided which can seek services from facility 901, 902 or facility 903.

At facility 901, four server systems are included, illustrated as server systems 905, 906, 907 and server system 908. Similarly, for the purposes of this example, a further four server systems, 909, 910, 911 and 912 are provided at the European facility 902. Again, for the purpose of illustration, four server system 913, 914, 915 and 916 as provided in facility 903 in the Far East.

Graphic 917 at the traffic management system 904 illustrates that total demand for services is approximately 50 percent of the total capability. The traffic management system 917 therefore has a degree of discretion in terms of where services can be derived from.

For the purposes of this embodiment, it is assumed that it is preferable to seek services from facilities that are currently operating during the night. Thus, in this example, it may be assumed that it is night time in Europe therefore server facility 902 is seen as the optimum source for services.

Such a situation could arise because the server system in Europe could be experiencing off peak provision, where local demand is low, such that the services could be provided at an off peak price. Alternatively, or in addition, it is also known that less cooling will be required during night time operation. Consequently, during this period, maximum provision is derived from server system 909 to 912, as illustrated by there respective graphic representations 918. No provision is taken from the Asian facility 903 and once European facility 902 has saturated, additional service is provided by facility 901 and in particularly, in this example, server system 905.

Thus, power costs may vary at different times of the day and may be different at different data centre facilities.

FIG. 10

Figure 9:
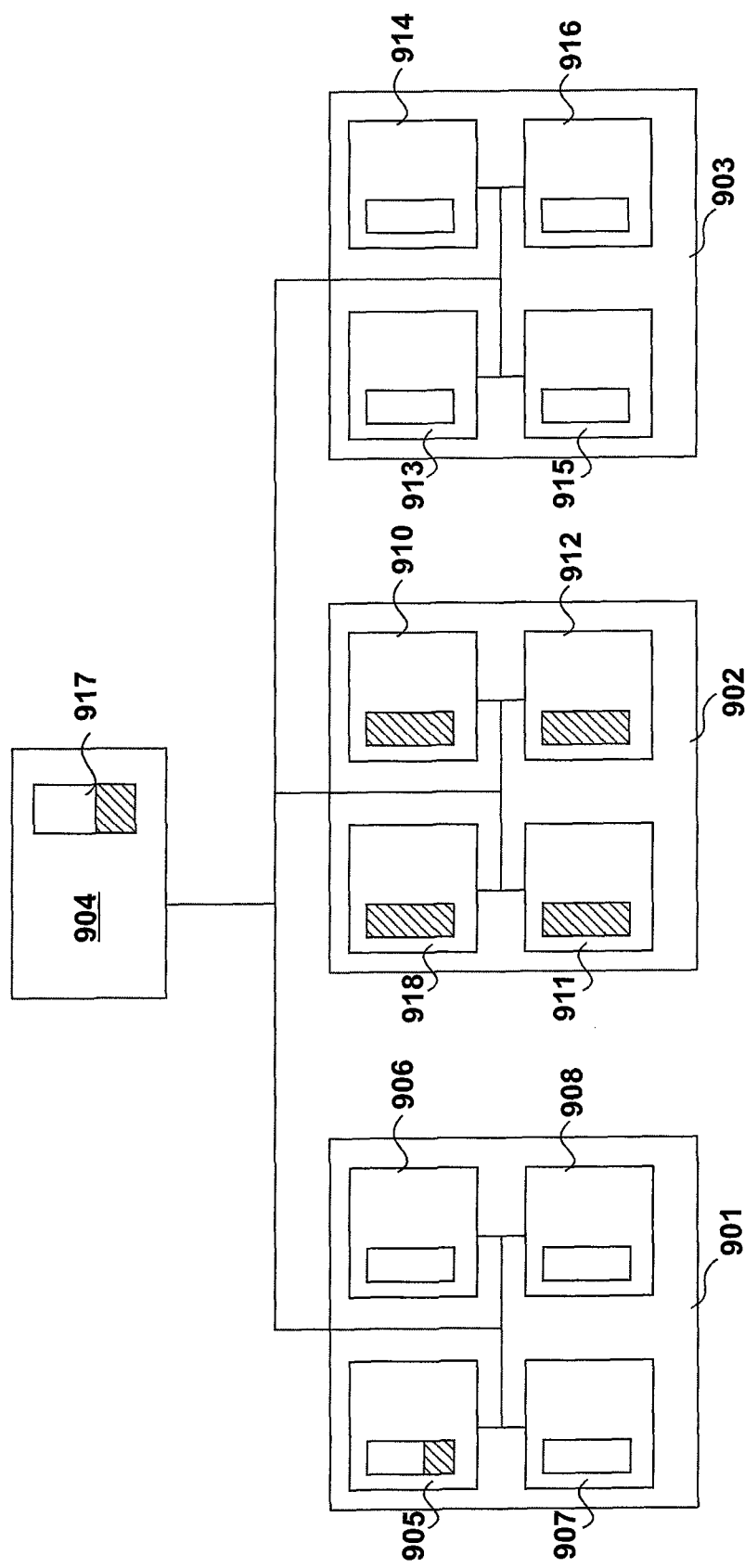
FIG. 9 illustrated the use of facilities in different geographical areas.
Figure 10:
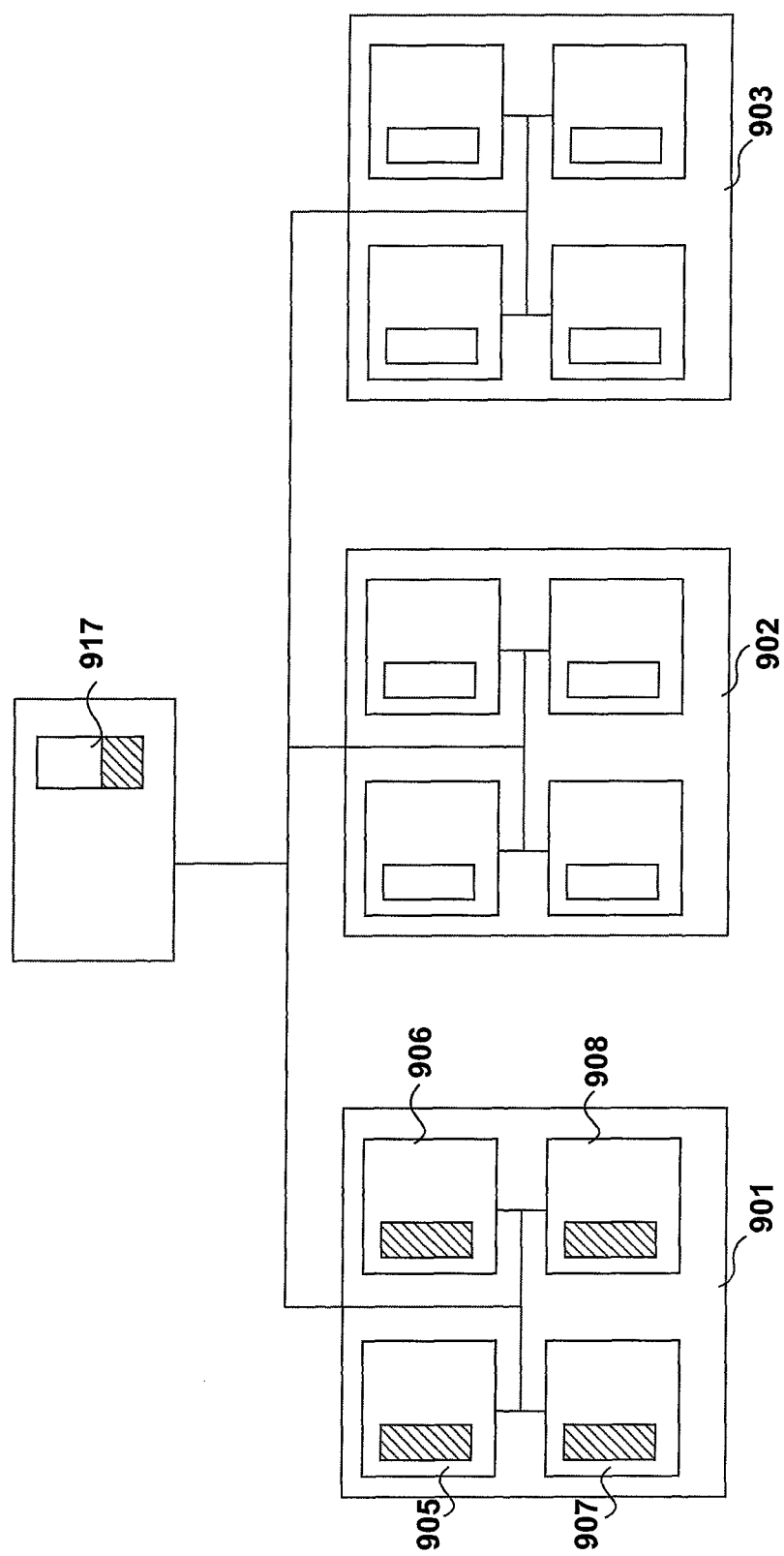
FIG. 10 shows a further example of facilities in different geographical areas.

The configuration shown in FIG. 10 is substantially similar to that illustrated in FIG. 9 but at a different point in the day. The over all demand illustrated by graphic 917 is slightly less than before therefore the total demand can be provided from a single facility. In this example, due to the time of day, service provision is being obtained from the Americas based facility 901. For the purposes of this example, if server system 901, server system 906 and server system 908 are operating at maximum capacity. Server system 907 is operating below maximum capacity therefore additional capacity is available should overall demand increase. However, should all server systems 905 to 908 at facility 901 reach their maximum traffic volume, further resources will be derived from the Asian facility 903. Thus, this cycle of switching from geographical location will follow a daily cycle.

Thus, with the non performance variable being the time of day or taking account of the time of day, greater use is made of a group of server computers at a specific facility during the first selected period and less use is made of this group of server computers during the second selected period. The first selected period (when more use is made) may be the early hours of the morning and the second selected period may be late afternoon or the early evening. Periods in between, neither off peak nor high demand, may provide marginal capacity as overall demand for service increases.

FIG. 11

Figure 11:
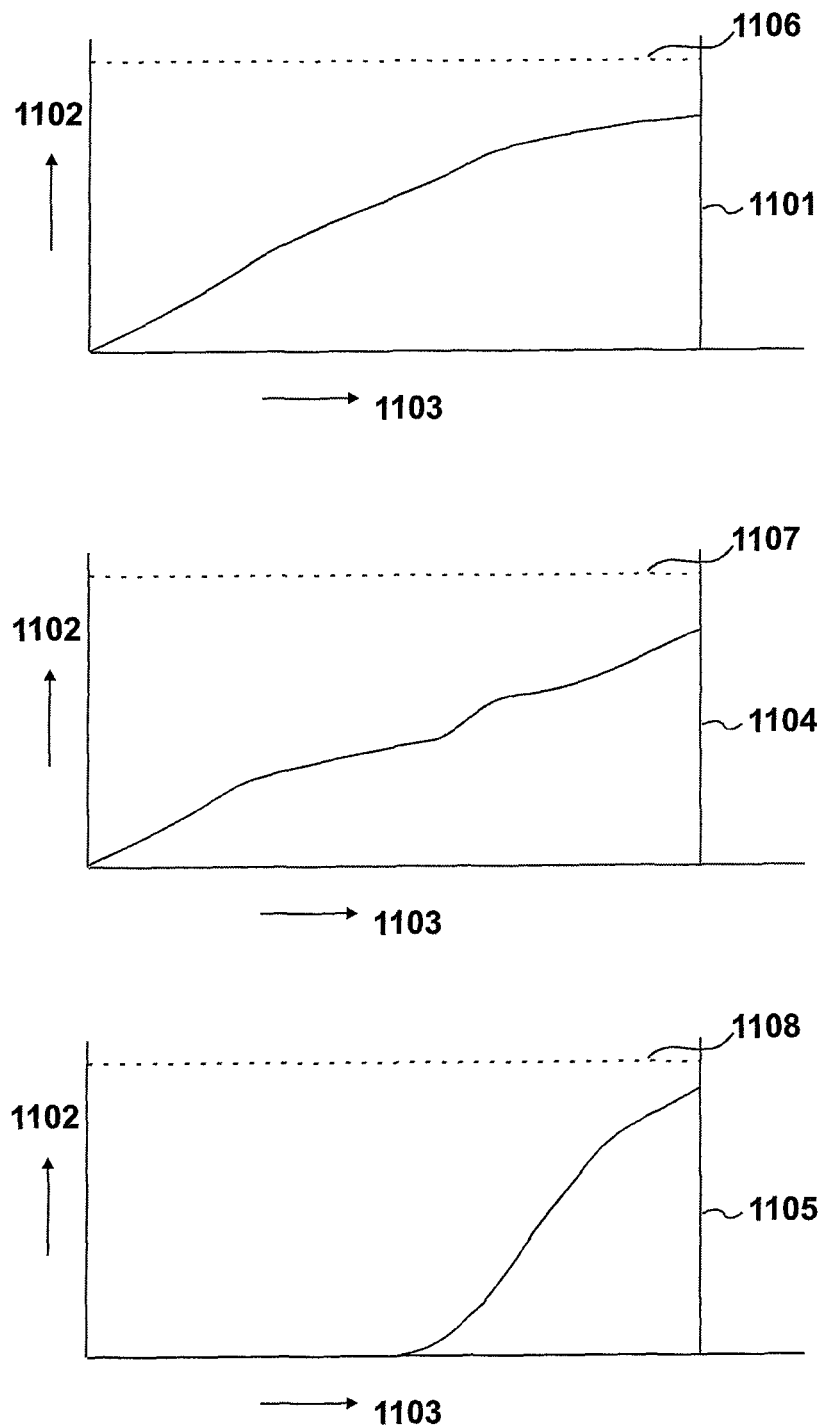
FIG. 11 illustrates bandwidth use in a plurality of facilities
Figure 13:
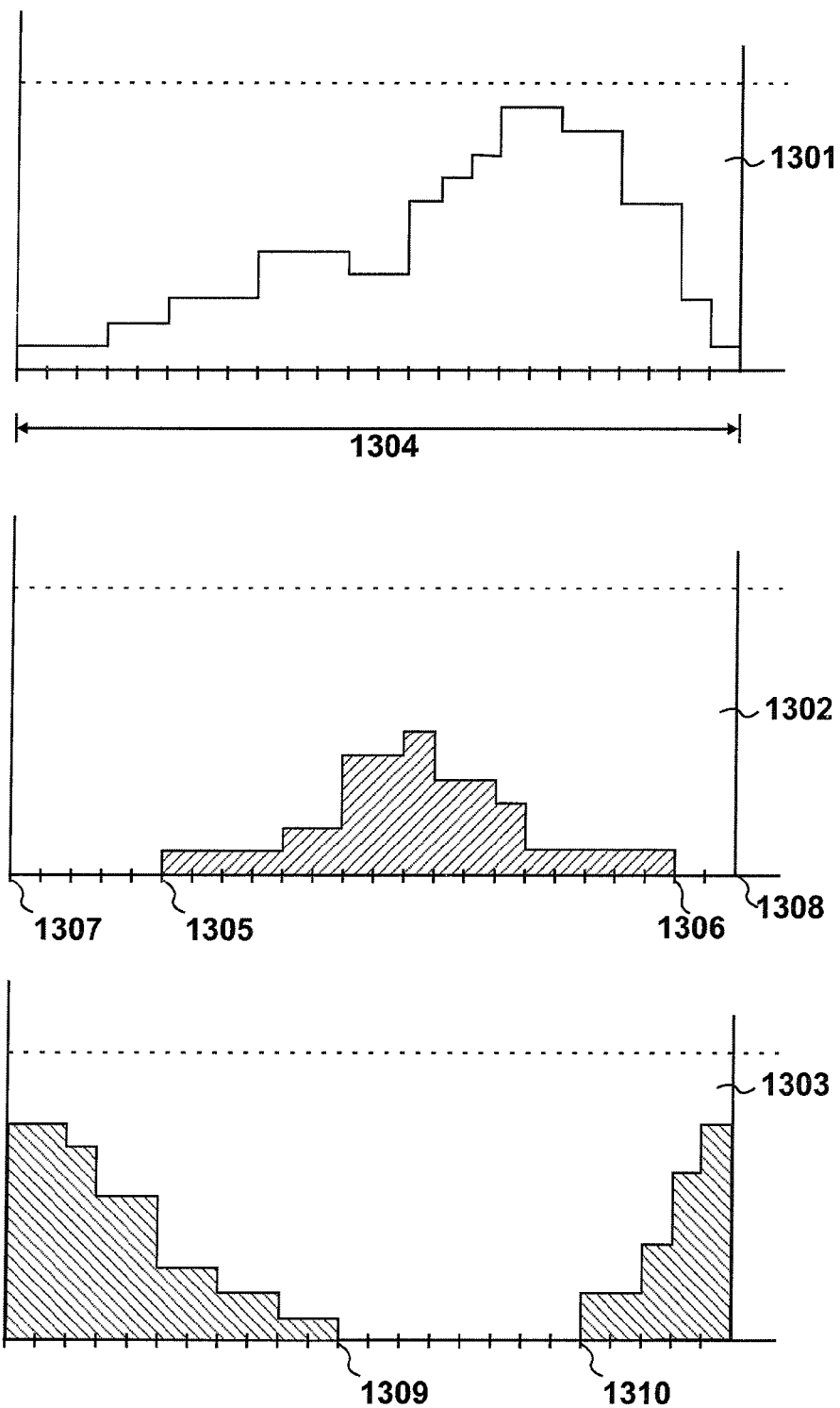
FIG. 13 shows duty cycles for a plurality of facilities.
Figure 14:
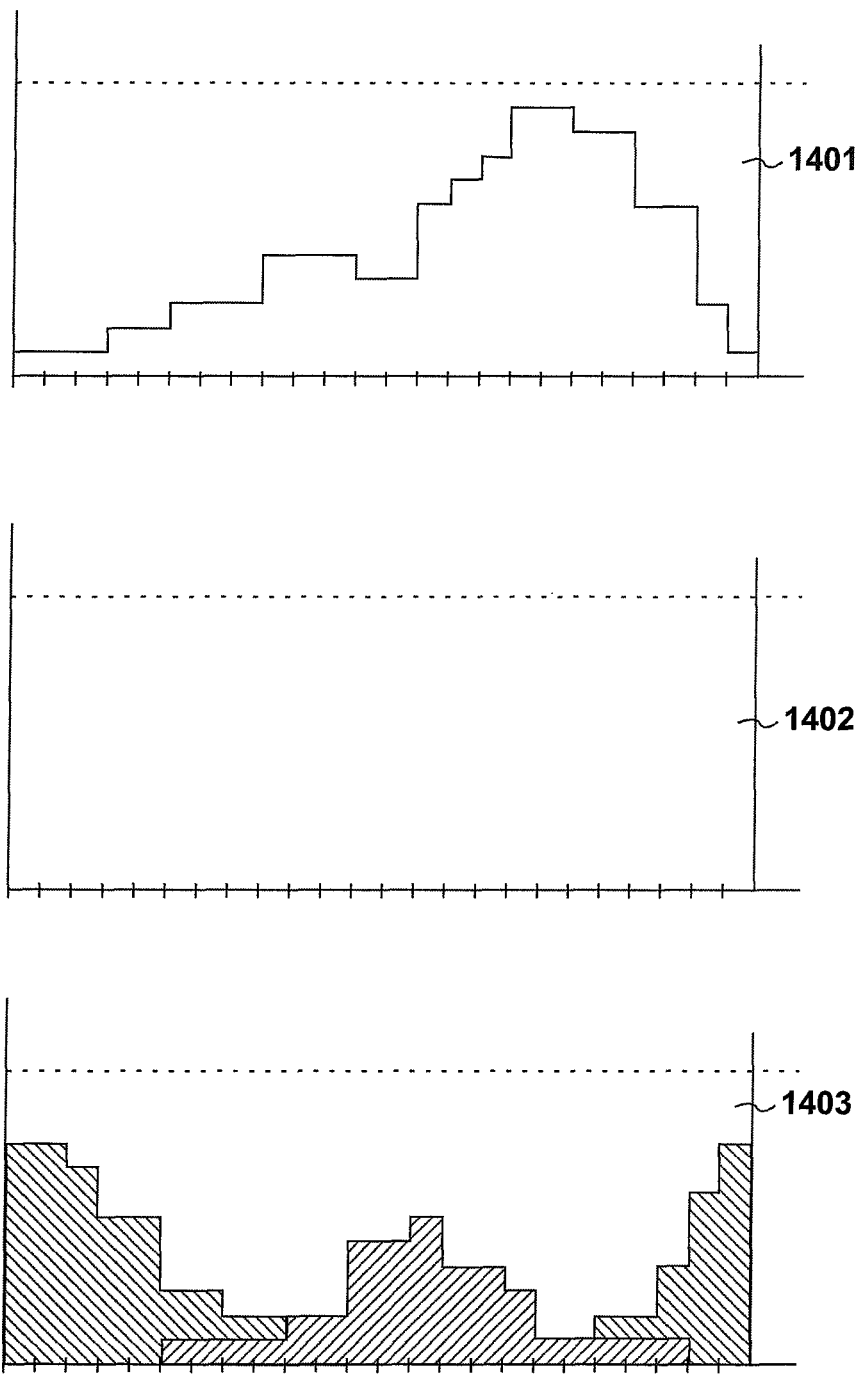
FIG. 14 illustrates duty cycles which have been optimised.

In a further embodiment, the non-performance related variable may be bandwidth. Thus, for a first group of server computers at a specific facility, less use may be made of this group if a data volume accessed over a pre determined period has exceeded a pre-determined threshold. In FIG. 11, graph 1101 represents accumulated data volume 1102 plotted against time 1103 for facility 901. Graph 1104 represents a similar plot for facility 902 and graph 1105 represents a similar plot for facility 903. Each graph has a threshold value 1106 for facility 901, 1107 for facility 902 and 1108 for facility 903. This represents an agreed data volume requirement for a specified period of time, such as twenty four hours. This allows the facility owner to plan and provide sufficient capacity for anticipated demand. Consequently, a user is not prevented from using a larger data volume than agreed (assuming capacity is available) that it is likely that the user will be charged at a higher rate. Consequently, in preference to exceeding the threshold and being charged at this higher rate, it is preferable for the user to seek service elsewhere should this be possible.

In the example shown, none of the thresholds (1106 to 1108) have been exceeded. However, for the purposes of this example, given other factors (possibly the time of day) the traffic management system prefers to seek service from facility 901 with facility 902 providing backup and facility 903 only been used if necessary.

FIG. 12

Graphs 1101 to 1103 are repeated in FIG. 12. A pre-determined period 1201 is illustrated over which the data volume should not exceed the threshold 1106. Following the procedures previous described, traffic has been redirected to facility 901 such that facility 901 now reaches it threshold value at time 1202.

At time 1203 procedures conducted at the traffic management system have identified the rate at which band width is being used therefore an assessment has been made to the effect that provision will be required from elsewhere. Thus, referring to graph 1102 it can be seen that at time 1203 provision starts to be obtained from facility 902. Again, at time 1204 threshold value 1107 is reached therefore further provision must be derived from facility 903. Thus, at time 1204 service is obtained from facility 903 but, as can be seen by comparing this with a similar graph shown in FIG. 11, it can be seen that the extend to which facility 903 has been used has been significantly reduced.

FIG. 13

In a further embodiment, the non-performance variable is a duty cycle such that a server computer or a group of server computers at a facility are deactivated if their duty cycles falls below a pre determined threshold. A deployment of this approach is desirable if charges are submitted for facility use based on an assessment as to whether the facility has been used at all for a pre-determined period. Thus, the pre-determined period maybe an hour or a day for example. Charges may be submitted on the basis that this facility has been used during this pre-determined period of an hour or of a day. If, for example, use is only made for five minutes then a charge is submitted for the whole period. Thus, short duty cycles may result in disproportionate high charges. Within the realms of this constraint, if a service system or a facility is to be used it is better for it to be used for long duty cycles and not short bursts.

Thus, it is possible for the traffic management system to consider time granularity. In particular, if being charged by the hour for example, it is preferable to keep a particular service system or facility busy for the full hour rather than turning it off and then turning it back on again. In some situations, it is possible that turning the system on for two five minute duty cycles will incur charges for an hour each time the device is turned on, even if turned on for five minutes.

Graph 1301 represents a duty cycle for facility 901, graph 1302 represents a duty cycle for facility 902 and graph 1303 representing a duty cycle for facility 903. Period 1304 represents the pre-determined threshold. If a system is being used throughout the pre-determined threshold, it has a duty cycle that is considered to be acceptable. As illustrated in this example, such a situation exists for facility 901.

Referring to graph 1302, facility 902 has started a duty cycle at time 1305 and this duty cycle completes at 1306. However, in some situations, charges maybe submitted for the period 1307 to 1305 and period 1306 TO 1308, even though the user is not obtaining any utility.

A similar situation exists in 903 as illustrated by graph 1303. In this example, two duty cycles fall within the pre-determined threshold such that no use is being made of the facility from time 1309 to time 1310.

FIG. 14

In this example, the traffic management system has identified a situation to the effect that facility 902 and facility 903 are not optimising their duty cycles. For the purposes of this example, an assessment has also been made to the effect that it would be preferable to combine these duty cycles so as to fully engage with facility 903 and obtain no service from facility 902.

As illustrated in graph 1401, this procedure does not affect the way in which the traffic management system 904 derives service from 901. However, as shown by graph 1402 and 1403 the previous bandwidth provided by facility 902 has been shifted to facility 903. This now creates a combined duty cycle that does not fall below the pre-determined threshold. Consequently, in some situations, it may be possible to derive substantial savings by effectively transferring all requests previously sent to facility 902 to facility 903.

Upon realisation that it is possible to derive benefit from modifying load balancing processes in response to the reading of non-performance variables, it can be appreciated that many complex combinations of variables may be combined and sophisticated courses of action maybe developed. The measures taken may reside solely within the capabilities of the traffic management environment, such as redirecting traffic as described here in. However, in alternative embodiments it will be possible to take more active measures such as reducing CPU clock speed or switching off some cores of multi-core CPU devices.

Dependent upon user requirements and the nature of the variable being considered, it maybe preferable to run all servers below threshold levels or, alternatively, it may be preferable to rely heavily on a few nodes and only bring others on line when required.

Temperatures, power consumption and other factors can be measured and tracked along with the actions that were taken as a result in order to analyse the effectiveness of the system.

Adjustments maybe made for an environmental reason or to reduce operational costs. Thus, chargeable resources may include power, bandwidth, storage and processor power. The load balancer can shape the bandwidth by delaying or dropping connections and could also track bandwidth usage and switch traffic between servers to minimise charges.

Resources may be organised into resource groups with a shared property such as, virtually running on the same physical server.

It may be preferable to have servers located together, so that infrastructure is shared providing a local measurement of power. Alternatively, it may be preferable to have the servers dispersed to minimise risk and thereby reduce the consequences of a server centre or device region becoming non-operational.

External monitors may be provided to keep track of readings of temperature and power consumption which in turn can feed control data back to the load balancing system.

What is claimed is:

1. A method of controlling the operation of a plurality of server computers wherein at least some of the plurality of server computers is located at a first facility and at least one of the plurality of server computers are located at a second facility by using a traffic manager, comprising the steps of:
   the traffic manager reading a set of non-performance related variables, and wherein information about traffic between clients and the plurality of server computers passes through the traffic manager and the traffic is directed by the traffic manager;
   the traffic manager determining if at least one of the non-performance related variables of the plurality of server computers can be improved by diverting tasks away from the plurality of server computers at the first facility to the at least one server computer located at the second facility; and
   in response to determining that the at least one of the non-performance related variables of the plurality of server computers located at the first facility can be improved by diverting the tasks away from the plurality of server computers located at the first facility, diverting the tasks away from the servers at the first facility, at least temporarily shutting down servers at the first facility, and the traffic manager balancing load across the remaining active server computers at the second facility, wherein said non-performance variable is a duty cycle charge, such that at least one server computer located at the first facility is de-activated if its duty cycle falls below a predetermined threshold, wherein a duty cycle charge is a charge incurred whenever the at least one server computer is utilized for any duration during a predetermined period.

2. The method of claim 1, wherein said non-performance variable is power consumption or temperature.

3. The method of claim 1, wherein said non-performance related variable is the time of day, such that:

greater use is made of the at least one server computer located at the first facility during a first selected period; and less use is made the at least one server computer located at the first facility during a second selected period.

4. The method of claim 1, wherein said non-performance related variable is bandwidth for the at least one server computer located at the first facility, such that less use is made of the at least one server computer located at the first facility if a data volume accessed during a predetermined period exceeds a predetermined threshold.

5. A traffic management computer for controlling the operation of a plurality of server computers is located at a first facility and at least one of the plurality of server computers is located at a second facility, a network connecting the first facility, second facility and one or more traffic management computers, the traffic management computer comprising:
   a processor; and
   a non-transitory computer readable medium storing instructions that when executed by the processor cause the traffic management computer to:
   perform a load balancing process to enhance operational performance;
   receive a set of non-performance related variables, wherein the set of non-performance related variables includes operating temperature the at least one server computer located at the first facility and the at least one server computer is located at the second facility, and wherein information about traffic between clients and the plurality of server computers passes through the traffic management computer;
   determine if the operating temperature of the at least one server computer located at the first facility can be reduced by diverting existing traffic away from the at least one server computer located at the first facility to the at least one server computer is located at the second facility;
   diverting the existing traffic away from the at least one server computer located at the first facility without deactivating the at least one server computer located at the first facility in response to determining that the operating temperature of the at least one server computer located at the first facility can be reduced by diverting the existing traffic away from the server computer; and
   balancing load across the remaining active server computer bandwidth at the first facility and the second facility, wherein said non-performance related data is a duty cycle charge for operation of the servers, such that the total number of active servers is reduced and workload passed to other operational servers in order to optimise the duty cycle charge for the cumulative operation of the remaining operational servers.

6. The apparatus of claim 5, wherein said at least one non-performance related variable is selected from a selection of non-performance variable, comprising: energy consumption, bandwidth restrictions, equipment proximity, time of day and duty cycle.

7. The apparatus of claim 6, wherein the at least one server computer located at the first facility is de-activated along with the rest of the plurality of server computers located at the first facility so as to place the whole group in a non-operational state.

8. The apparatus of claim 5, wherein each server computer has a system clock operating at a first clock frequency and the frequency of said system clock is reduced to a second clock frequency, or a core in a multi-core processor is deactivated in response to said non-performance variable, wherein the server remains active when at the second clock frequency.

9. A computer program product, stored on a non-transitory computer readable medium, the product comprising instructions operable to cause a traffic manager to perform a method for load balancing of data sources connected to a network to enhance performance, the method comprising:
   receiving a set of non-performance related variables associated with data sources located at a first facility, and wherein the traffic between clients and the data sources passes through the traffic manager;
   determining if the non-performance related variables of the data sources located at the first facility can be reduced by diverting traffic away from a server computer located at the first facility to a data source that is located at a second facility; and
   in response to determining that the non-performance related variables of the data sources located at the first facility can be reduced by diverting traffic away from the data source at the first facility, the traffic manager diverting the tasks away from the servers at the first facility, and balancing load across the remaining active server computers at the second facility, wherein said non-performance variable is duty cycle charge, wherein data sources are selected in order to maintain active use over an operational period while other data sources remain totally inactive over said period.

10. The computer program product of claim 9, wherein said instructions configure the traffic manager to de-activate the plurality of server computers located at the first facility.

11. The computer program product of claim 9, wherein said non-performance related variable is time of day, such that greater use is made of data sources resident at geographical locations that are experiencing off-peak conditions or cooler operating temperatures.

12. The computer program product of claim 9, wherein said non-performance related variable is bandwidth, such that a data source is no-longer selected after a predetermined level of data output.

* * * * *